(No Model.)
J. R. GRIFFITHS.
ELECTRIC RAILWAY TROLLEY.
No. 498,933. Patented June 6, 1893.
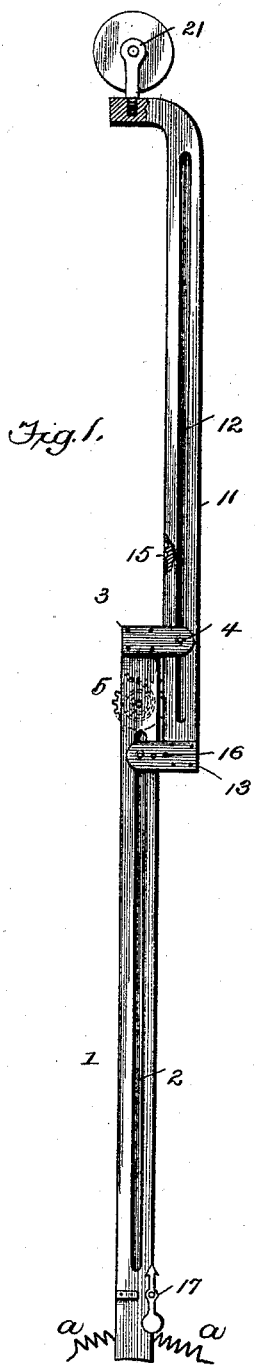
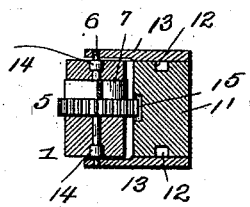
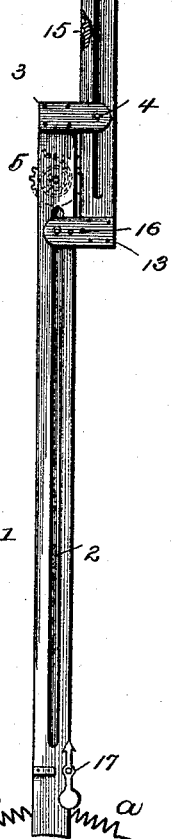
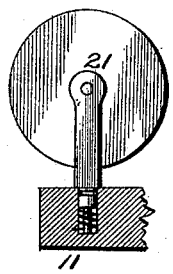
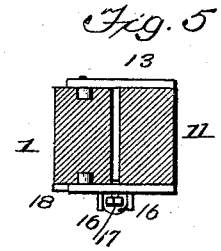
Witnesses
Inventor
J. R. Griffiths
By W. H. Bartlett
Attorney
THE NORRIS PETERS CO., PHOTO-LITHO., WASHINGTON, D. C.

UNITED STATES PATENT OFFICE.

JAMES R. GRIFFITHS, OF CHICAGO, ILLINOIS.

ELECTRIC-RAILWAY TROLLEY.

SPECIFICATION forming part of Letters Patent No. 498,933, dated June 6, 1893.

Application filed July 6, 1892. Serial No. 439,093. (No model.)

*To all whom it may concern:*

Be it known that I, JAMES R. GRIFFITHS, residing at Chicago, in the county of Cook and State of Illinois, have invented certain new and useful Improvements in Trolley-Poles, of which the following is a specification, reference being had therein to the accompanying drawings.

This invention relates to trolley poles, or supports for making contact with an overhead wire on electric railways.

The object of the invention is to produce an extensible trolley pole, which shall be self operating to retain the contact wheel or piece in contact with the wire.

Figure 1 is a side elevation of so much of a trolley pole as is necessary to illustrate my invention. Fig. 2 is a cross section on line $x$—$x$, Fig. 1. Fig. 3 is a detail showing the spring connection of the wheel with its support. Fig. 4 is a broken detail showing gravity catch. Fig. 5 is a cross section looking down on gravity catch.

The lower section 1 of the pole is connected to the top of a car in any usual manner, so as to swing down under pressure. I may use such a hinged base as is shown in my Patent No. 455,322, of July 7, 1891, or any other suitable base to support the pole 1. Springs to hold the pole normally elevated but to permit its depression are indicated at $a\,a$. The pole section 1 as illustrated has grooves 2 in its side, which act as guide ways. The pole section bears, near the top, a pair of cleats 3, which are firmly secured to section 1, and project at one side of said pole section. These cleats support small pulleys or anti friction wheels 4 near their outer ends. The upper pole section 11 is generally similar in construction to pole 1, and has guide grooves 12, into which the guide wheels 4 of cleats 3 project. The upper pole section 11 has cleats 13 which carry guide rolls 14, which rolls project or extend into grooves 2 in the pole section 1. The pole thus consists of two sections, held alongside each other, and the top section capable of extension with reference to the bottom section.

Of course it will be understood that other equivalent forms of pole may be adopted, and that it is not essential that each pole section shall carry one set of cleats and rolls. The poles illustrated are merely examples of numerous forms of extensible poles I may use.

The pole 1 carries a pinion 5, sustained on a suitable arbor 6. The arbor 6 has a strong coil spring 7 attached, and arbor and spring, and the body of the pinion may be covered by a suitable casing. The pinion 5 projects slightly over the side of the pole section 1, and the teeth of the pinion engage a rack 15 which rack is carried by the pole section 11. The pinion is driven by the coil spring 7 in such manner as to engage the rack, and normally project the pole section 11 to its extreme elevated position, as indicated in Fig. 1. The pole section 11 carries a grooved contact wheel 21, which runs on the lower surface of an overhead wire. The wheel and pole sections are of metal, or have metallic contact pieces to convey the electric current from the wire to the place where it is used on the car. When the contact wheel 21 is against the wire, it will be held up by the spring 6 acting to extend the upper pole section, through the rack and pinion connection. As the car carries the contact wheel along the wire, the upper pole section will be extended by the spring, or pressed back by the wire, accordingly as the distance between the wire and car roof is greater or less. Until the upper section is pressed down to the extent of its movement, the proper or preferable position of the pole will be about perpendicular, and this position will be maintained by the base springs or supports. When the upper section of the pole has been pressed down to the extent of its movement, the pins, loops, or catches 16, carried by the top section of the pole, are brought into proximity with the gravity catch 17 carried by the bottom pole section. Then a further depression of the wheel 21 swings the pole out of perpendicular. The gravity catch 17 has an engaging hook at each side, and this hook engages the one or the other pin or stop 16, according to the direction in which the pole swings. As soon as the hook 17 engages one of the stops 16, the hook will retain the pole in its closed position as long as the pole stands at an inclination, and the contact wheel will be held up to the wire by the base support, (as springs $a$—$a$,) which maintain the pole at the proper angle. If the height of the wire again becomes such as to permit the rise of the pole to a perpendicular position, the gravity catch 17 will be disengaged, and the upper pole section will then be extensible.

I have illustrated only one form of catch to hold the pole sections in non-extended position, but I have devised other forms of catch for the same purpose. The object of holding the extensible pole in contracted position is to prevent the sudden "shooting out," as it were, of the upper pole section when the pressure which inclined the pole is removed. The sudden extension of the top pole section is liable to throw the contact wheel away from the wire. This tendency is overcome by the use of a holding catch.

The gravity catch 17 is shown as supported on a bracket or arm 18 attached to the lower pole section; but the construction and location of such a catch may be so varied that the illustration is merely exemplary.

The contact wheel 21 is supported on a shaft which has its bearings in a yoke 22, and said yoke is connected to the upper pole section by a swivel or pintle, which permits a turning of the yoke. A spring 23, connected to the yoke and pole section, tends to hold the wheel normally in the direction of the movement of the car, but yields to permit the wheel to adjust itself to changes in direction of the wire. The contact wheel is thus supported like a caster wheel, with spring to hold it to a normal position, but to permit the supporting yoke to turn on its pintle.

While a rack and pinion have been described, as connecting the movable pole section to its springs it will be apparent to the skilled mechanic that a friction driving wheel will under some circumstances do the same work.

Suitable bearing rolls, other than the rolls 4 and 14, may be interposed to permit an easy extension of the top section of the pole.

I claim—

1. The trolley pole consisting of parallel sections held side by side by cleats or brackets, and a spring actuated wheel connected to one section in such manner as to extend it relatively to the other, substantially as described.

2. The trolley pole consisting of a plurality of extensible sections, a rack connected to one section, and a spring driven pinion engaging said rack to project the extensible section, in combination substantially as described.

3. The trolley pole having two sections held parallel by suitable clasping devices, a rack on one section and a pinion on the other section and engaging said rack, and a coiled spring connected to the pinion to drive the same, all in combination.

4. The trolley pole consisting of extensible sections and means for projecting one of them, and a retaining catch operating to hold the extensible section in closed position, so that the same be not projected when the pole is in inclined position, in combination substantially as described.

5. The trolley pole consisting of sections, means for extending one of these sections relatively to the other, and a gravity catch operating on the extensible section to hold the same down when the extensible section is pressed down to the catch, and the pole is swung out of perpendicular.

6. The extensible pole sections and the rack and spring actuated connection, the gravity catch, and the stops on one pole section with which said catch engages when the upper pole section is pressed down and the pole swings out of normal position, all combined substantially as described.

In testimony whereof I affix my signature in presence of two witnesses.

JAMES R. GRIFFITHS.

Witnesses:
W. A. BARTLETT,
S. BRASHEARS.